(12) United States Patent
Lopez et al.

(10) Patent No.: US 9,268,534 B1
(45) Date of Patent: Feb. 23, 2016

(54) MANAGING THE RELEASE OF ELECTRONIC CONTENT USING A TEMPLATE WITHOUT VERSION LOGIC

(75) Inventors: Gus Lopez, Seattle, WA (US); Nigel Green, Bellevue, WA (US); Alexandre Edelman, Seattle, WA (US); Jules Graybill, Seattle, WA (US); Doug Treder, Shoreline, WA (US)

(73) Assignee: Amazon Technologies, Inc., Reno, NV (US)

( * ) Notice: Subject to any disclaimer, the term of this patent is extended or adjusted under 35 U.S.C. 154(b) by 2395 days.

(21) Appl. No.: 12/043,815

(22) Filed: Mar. 6, 2008

Related U.S. Application Data

(62) Division of application No. 10/427,709, filed on Apr. 30, 2003, now Pat. No. 7,373,594.

(51) Int. Cl.
*G06F 9/44* (2006.01)

(52) U.S. Cl.
CPC .......................................... *G06F 8/33* (2013.01)

(58) Field of Classification Search
CPC ............... G06F 8/33; G06F 8/34; G06F 8/71; G06F 9/4443
USPC .......................................... 717/109, 110, 111
See application file for complete search history.

(56) References Cited

U.S. PATENT DOCUMENTS

| | | |
|---|---|---|
| 5,907,705 A | 5/1999 | Carter |
| 5,966,533 A | 10/1999 | Moody |
| 6,038,601 A | 3/2000 | Lambert et al. |
| 6,188,999 B1 | 2/2001 | Moody |
| 6,199,204 B1 | 3/2001 | Donohue |
| 6,256,773 B1 | 7/2001 | Bowman-Amuah |
| 6,286,043 B1 | 9/2001 | Cuomo et al. |
| 6,356,903 B1 | 3/2002 | Baxter et al. |
| 6,505,212 B2 | 1/2003 | Nakano |
| 6,596,030 B2 | 7/2003 | Ball et al. |
| 7,062,506 B2 | 6/2006 | Taylor et al. |
| 7,194,678 B1 | 3/2007 | Koike et al. |
| 7,219,350 B2 | 5/2007 | Bhogal et al. |
| 7,251,681 B1* | 7/2007 | Gourlay ......................... 709/214 |
| 2001/0011265 A1* | 8/2001 | Cuan et al. ......................... 707/1 |

(Continued)

OTHER PUBLICATIONS

U.S. Appl. No. 10/335,222, Edelman et al.

(Continued)

*Primary Examiner* — Anna Deng
(74) *Attorney, Agent, or Firm* — Robert C. Kowert; Meyertons, Hood, Kivlin, Kowert & Goetzel, P.C.

(57) ABSTRACT

A facility for rendering a dynamic electronic document is described. The dynamic electronic document has both a current and a future edition. The current edition incorporates a current version of a content item, while the future edition incorporates a future version of the content item. The facility receives a request to return the dynamic electronic document. In response to the request, the facility retrieves a template for the electronic document that contains a single identifier that identifies a group of content item versions containing both the current version of the content item and the future version of the content item. The facility uses the single identifier contained in the template, together with an indication of whether the current edition of the dynamic electronic document or the future version is being requested by the received request, to incorporate the appropriate version of the content item in the rendered dynamic electronic document.

16 Claims, 8 Drawing Sheets

(56) References Cited

U.S. PATENT DOCUMENTS

| | | | |
|---|---|---|---|
| 2001/0039594 A1* | 11/2001 | Park et al. | 709/311 |
| 2002/0046244 A1 | 4/2002 | Bimson et al. | |
| 2002/0049697 A1* | 4/2002 | Nakano et al. | 707/1 |
| 2002/0059371 A1* | 5/2002 | Jamail et al. | 709/203 |
| 2002/0194194 A1 | 12/2002 | Fenton et al. | |
| 2002/0198878 A1 | 12/2002 | Baxter et al. | |
| 2003/0041094 A1* | 2/2003 | Lara et al. | 709/201 |
| 2004/0034830 A1 | 2/2004 | Fuchs et al. | |
| 2004/0123238 A1 | 6/2004 | Hefetz et al. | |
| 2004/0123244 A1 | 6/2004 | Campbell et al. | |
| 2004/0172409 A1 | 9/2004 | James | |
| 2005/0114784 A1 | 5/2005 | Spring et al. | |
| 2006/0015632 A1 | 1/2006 | Tiemann et al. | |
| 2006/0265355 A1 | 11/2006 | Taylor et al. | |
| 2006/0282501 A1 | 12/2006 | Bhogal et al. | |

OTHER PUBLICATIONS

U.S. Appl. No. 10/427,709, Lopez.
U.S. Appl. No. 11/694,578, Lopez.
"Architecture and Technology," pirobase, Product, Pironet NDH internet for success, © 2002 by Pironet NDH AG, 3 pages, http://www.pironet-ndh.com/servlet/PB/menu/1002786findex.html, [last accessed Sep. 25, 2002].
"Content Life Cycle," pirobase, Product, Pironet NDH internet for success, © 2002 by Pironet NDH AG, 2 pages, http://www.pironet-ndh.com/servlet/PB/menu/1002873/index.html, [last accessed Sep. 25, 2002].
"Content Management Server 2001 Workflow, Detailed Feature Description," Microsoft Content Management Server 2001, Published Jul. 2001, © 2001 Microsoft Corporation, 13 pages.
"Content Management Server 2001 Workflow, Detailed feature description," Posted Jul. 6, 2001, Microsoft Content Management Server, 2 pages, http://www.microsoft.com/cmserver/evaluation/cmsworkflow_wp.htm, [last accessed Sep. 30, 2002].
"Content Management: At the Center of e-business," An Executive White Paper, Jul. 2001, AberdeenGroup, © 2001 Aberdeen Group, Inc., 10 pages, http://www.aberdeen.com/cgi-bin/rf.cgi?doc_id=07012572, [last accessed Sep. 24, 2002].
"divine Content Server™—Overview," divine™, © 2002 divine, inc., 2 pages [web page last accessed Sep. 24, 2002].
"Fast Facts," Microsoft Content Management Server 2001, © 2001 Microsoft Corporation, 1 page.
"FileNET Web Content Management," FileNET, © 2002 FileNET Corporation, 2 pages, http://www.fllenet.com/English/Products/WCW/020810012.asp, [last accessed Sep. 24, 2002].
"How RedDot CMS Works," RedDot CMS Architecture, RedDot Solutions, © 2002 RedDot Solutions, 2 pages, http://www.reddotsolutions.com/products/architecture.htm, [last accessed Sep. 25, 2002].
"Interwoven OpenDeploy, Technical Overview—Version 1.0," Interwoven, Domain Expertise Series, © 2001 Interwoven, Inc., pp. 1-7.
"Openpages 4.0 An Adpative Process Platform," Aug. 2002, An Openpages White Paper, © 2002 Openpages, Inc., pp. 1-19.
"Product Information Features," Microsoft Content Management Server, 2 pages, http://www.microsoft.com/cmserver/evaluation/features.htm, [last accessed Sep. 30, 2002].
"Product Overview," Microsoft Content Management Server, © 2002 Microsoft Corporation, 2 pages, http://www.microsoft.com/cmserver/evaluation/overview.htm, [last accessed Sep. 30, 2002].
"product suite overview," Interwoven Products, 2 pages, http://www.interwoven.com/cgi-bin/printable_page.cgi, [last accessed Sep. 18, 2002].
"RedDot CMS Basic Principles," RedDot Solutions, © 2002 RedDot Solutions, 4 pages, http://www.reddotsolutions.com/products/basicprinciples_smartedit.htm, [last accessed Sep. 25, 2002].
"RedDot CMS Key Features," RedDot Solutions, © 2002 RedDot Solutions, 7 pages, http://www.reddotsolutions.com/products/keyfeatures_multilevel_users.htm, [last accessed Sep. 25, 2002].
"Rhythmyx™ Content Manager, Key Features," Percussion Products, 4 pages, http://www.percussion.com/rhythmyx/keyfeatures.htm, [last accessed Sep. 25, 2002].
"Selecting a Web Content Management System," White Paper, FileNET Web Content Management, Apr. 2002, pp. 1-13.
"Site Executive," Systems Alliance, Products, © 2002 Systems Alliance Incorporated, 2 pages, http://www.systemsalliance.com/Products/index.html, [last accessed Sep. 30, 2002].
"Take Control of Your Content," Stellent Content Management, Products, © 2002 Stellent, Inc., 2 pages, http://www.stellent.com/intradoc-cgi/nph-idc_cgi.exe?IdcService=GET_DYNAMIC_CONV, [last accessed Sep. 30, 2002].
"Technical Overview: Code and Content Change Management for Web Applications," Serena ChangeMan WCM, © 2001 Serena Software, Inc., 17 pages.
"Technical White Paper," White Paper, FileNET Web Content Management, Apr. 2002, pp. 1-17.
"TechRankings Scorecard Reprint," Forrester Research, © 1997-2002 Forrester Research, Inc., 3 pages, http://www.forrester.com/TechRankings/Reprints/divine.html, [last accessed Sep. 24, 2002].
"Unify Code and Content Management for Web Development," Rational Suite ContentStudio™, Products, Rational the software development company, 3 pages, http://www.rational.com/products/cstudio/index.jsp, [last accessed Sep. 25, 2002].
"UpdateEngine 6," FatWire Software, Products, © 2002 FatWire Corporation, 3 pages, http://www.fatwire.com/products/UE6.html, [last accessed Sep. 24, 2002].
"UpdateEngine 6: Out-Of-The-Box Functionality," FatWire Software, © 2003 FatWire Corporation, 2 pages, http://www.fatwire.com/products/ootb.html, [last accessed Apr. 7, 2003].
"Vignette® V6 Content Suite Overview," Vignette®, © 1996-2002 Vignette Corporation, 2 pages, http://www.vignette.com/CDA/PrintVersion/0,4152,2215,00.html, [last accessed Sep. 30, 2002].
"Web Page Templating, Version 2.0," Interwoven, Domain Expertise Series, © 2000 Interwoven, Inc., pp. 1-8.
"Workflow & Web Content Management," White Paper, FileNET Web Content Management, Apr. 2002, pp. 1-7.
BroadVision One-To-One Content, © 2001 BroadVision, Inc., 4 pages.
Dart, Susan, "Content Change Management: Problems for Web Systems," CrossTalk The Journal of Defense Software Engineering, Jan. 2000 Issue, reprint of an article original © 1999 Springer-Verlag, Proceedings of the 9th International Symposium on System Configuration Management, 11 pages.
IBM Corporation and Transarc Corporation, "Encina Transactional Programming Guide," 1997.
Mediasurface—Enterprise web content management is the heart of e-business, Related Information, Business Benefits Homepage, 5 pages, http://www.mediasurface.com/productsection, [last accessed Sep. 24, 2002].
Merant Collage™, © 2002 MERANT, pp. 1-6.
Rogers, Bill, "Eldron's Unique Component-Based Approach to Content Management," Ektron White Paper, © 2002 Ektron, Inc., pp. 1-15.
Roxen CMS, 3 pages, http://www.roxen.com/page/103/139.html, [last accessed Sep. 25, 2002].
Susan Dart, Content Change Management: Problems for Web Systems, 1999, Springer-Verlag, Lecture Notes in Computer Science; vol. 1675, Proceedings of the 9th International Symposium on System Configuration Management, ISBN:3-540-66484-X, pp. 1-16.
Tridion Content Manager, 2 pages, www.tridion.com [last accessed Nov. 2, 2006].
vip ContentManager™, © 2002 Gauss Enterprise, Inc., 4 pages.
Wong, Raymond and Nicole Lam, "Managing and Querying Multi-Version XML Data with Update Logging," ACM, DocEng '02, Nov. 8-9, 2002.

\* cited by examiner

| resource version identifier | resource version content |
|---|---|
| 156032 |  |
| 864173 |  |
| 915632 |  |
| ⋮ | ⋮ | image resource version content table — 600

611 — 612

MANAGING THE RELEASE OF ELECTRONIC CONTENT USING A TEMPLATE WITHOUT VERSION LOGIC

CROSS-REFERENCE TO RELATED APPLICATION(S)

This application is a divisional of U.S. patent application Ser. No. 10/427,709 entitled "MANAGING THE RELEASE OF ELECTRONIC CONTENT USING A TEMPLATE WITHOUT VERSION LOGIC," filed on Apr. 20, 2003, which application is hereby incorporated by reference in its entirety.

TECHNICAL FIELD

The present invention is directed to the field of generating electronic content and to managing changes to such content.

BACKGROUND

The Internet comprises a large number of computers and computer networks that are interconnected through communication channels. Because it facilitates electronic communications between vendors and purchasers, the Internet is increasingly being used to conduct "electronic commerce." Electronic commerce refers generally to commercial transactions that are at least partially conducted using the computer systems of the parties to the transactions. For example, a purchaser can use a personal computer to connect via the Internet to a vendor's computer. The purchaser can then interact with the vendor's computer to conduct the transaction. Although many of the commercial transactions that are performed today could be performed via electronic commerce, the acceptance and widespread use of electronic commerce depends, in large part, upon the ease-of-use of conducting such electronic commerce. If electronic commerce can be easily conducted, more vendors and purchasers will choose to engage in electronic commerce.

One of the fundamental aspects of electronic commerce is the creation and maintenance of a useful web site through which vendors and buyers can carry out transactions. Typically, an e-commerce site allows vendors to display product information (e.g., product descriptions, price information, product images) and allows customers to browse for products and place and confirm orders. Initially creating this type of site can be complicated, costly, and time-consuming. As with the display of physical products in a store, it is important that product information on a web site be well organized and attractively displayed so customers can easily find what they are looking for. Likewise, it is desirable to provide a system for obtaining purchase information from customers in a simple and efficient way. Once the site is initially created, it is important to update the site as new products are offered for sale and old products are sold out or discontinued. Special sales or promotions may also call for changes to the site, as may reorganizations of the site to further optimize its usability.

The version of a web site that is currently being presented to customers is termed the "live" version of that web site. When a merchant's designers commence to make changes that will update the merchant's web site, it is desirable to continue to display the unchanged live version of the web site to customers until the designers' changes are completed, approved, and otherwise ready for release. At that point, the changed version of the web site becomes the new live version, and as such is presented to customers. A group of changes that is applied together to a web site in this manner is termed a "release."

One way of continuing to present the live version of the web site while simultaneously making changes to the web site that will be reflected in a future version is to make a copy of all of the data that comprises the live web site, including the scripted templates that represent each web page in the web site, all of the other digital content that is incorporated in pages of the web site, and various other data. The changes are then made to the copy. This approach has the advantage that the copy can be used to preview the changed version of the web site. In the case of large web sites, however, this approach can have a substantial impact on the data storage requirements for operating the web site.

In cases where the designers need to be able to simultaneously work on changes for multiple future releases of the web site, additional disadvantages appear for this approach. First, the need to have a separate full copy of the web site for each future release being worked on further increases data storage requirements. Further, when using this approach, a change must be applied to every release scheduled later than every release in which it is to be effective. For example, if at a particular point in time five different future releases exist, and a change is to be made to the second of these five, the change must be applied not only to the second, but also to the third, fourth, and fifth.

An alternative approach is make use of a differential rendering approach, in which there is only a single copy of the web site, but the pages of the web site can either be rendered in their live version, or rendered in accordance with a future release. This may be accomplished by, for each page of the web site that is changed, introducing tests into the script that is executed to transform the template representing the page into the page. These tests determine whether the page is to be rendered in its live version for presentation to customers, or in accordance with a future release for presentation to developers previewing that release. The script incorporates the content that is appropriate for the determined version based on the test results.

For example, a developer that wanted to change a particular page that, in the live version of the web site, includes a picture of an orange leaf to instead include a picture of a snowflake in a future release, would modify the script in the template for that page. In the script, the developer would change an unconditional command to incorporate the orange leaf picture to a conditional structure that (1) determines the version of the page being rendered, (2) if the version of the page being rendered is the live version, incorporates the orange leaf picture, and (3) if the version of the page being rendered is the future release version, incorporates the snowflake picture. In order to make the future release of the web site live, the scripts must again be modified to contain unconditional commands to incorporate the content as changed by the release, e.g., to replace the above-described conditional structure with an unconditional command to incorporate the snowflake picture.

This approach also has significant disadvantages. First, each changed page must be revised in the manner described, often manually. This requires substantial amounts of manual effort. Further, this manual process makes it difficult to use automated tools to specify changes for a release. Also, each time a page is changed in this manner, it is possible for the changes to introduce error. Additionally, introducing additional code paths by adding conditional structures makes the templates more complex to test. Furthermore, where more than one future release exists, the conditional structures become more complex, and correspondingly more difficult to test.

In view of the foregoing, those skilled in the art will appreciate that an improved mechanism for managing future releases would have significant utility.

In some cases, it may be desirable to operate a single web site on behalf of multiple merchants. Such a multiple-merchant web site can in some cases provide economies of scale, as well as marketing synergies that cause a customer to make more purchases on the combined web site than that customer would have otherwise made on individual single-merchant web sites.

Multiple-merchant web sites can raise difficult security issues, however. If developers for each merchant are granted authorization to change any page on the web site, one merchant's developer can carelessly or maliciously change a page of another merchant. If, on the other hand, the ability to change the pages of all of the merchants is restricted to employees of an organization that is responsible for operating the web site as a whole, an extra layer of delegation is imposed on the designers of each merchant—who have to communicate their changes to employees of the organization—and the organization incurs the extra cost of allocating designers to this task.

For these reasons, those skilled in the art will appreciate that an improved mechanism for managing modification permissions in a multiple-merchant web site would have significant utility.

DETAILED DESCRIPTION

Figure 1:
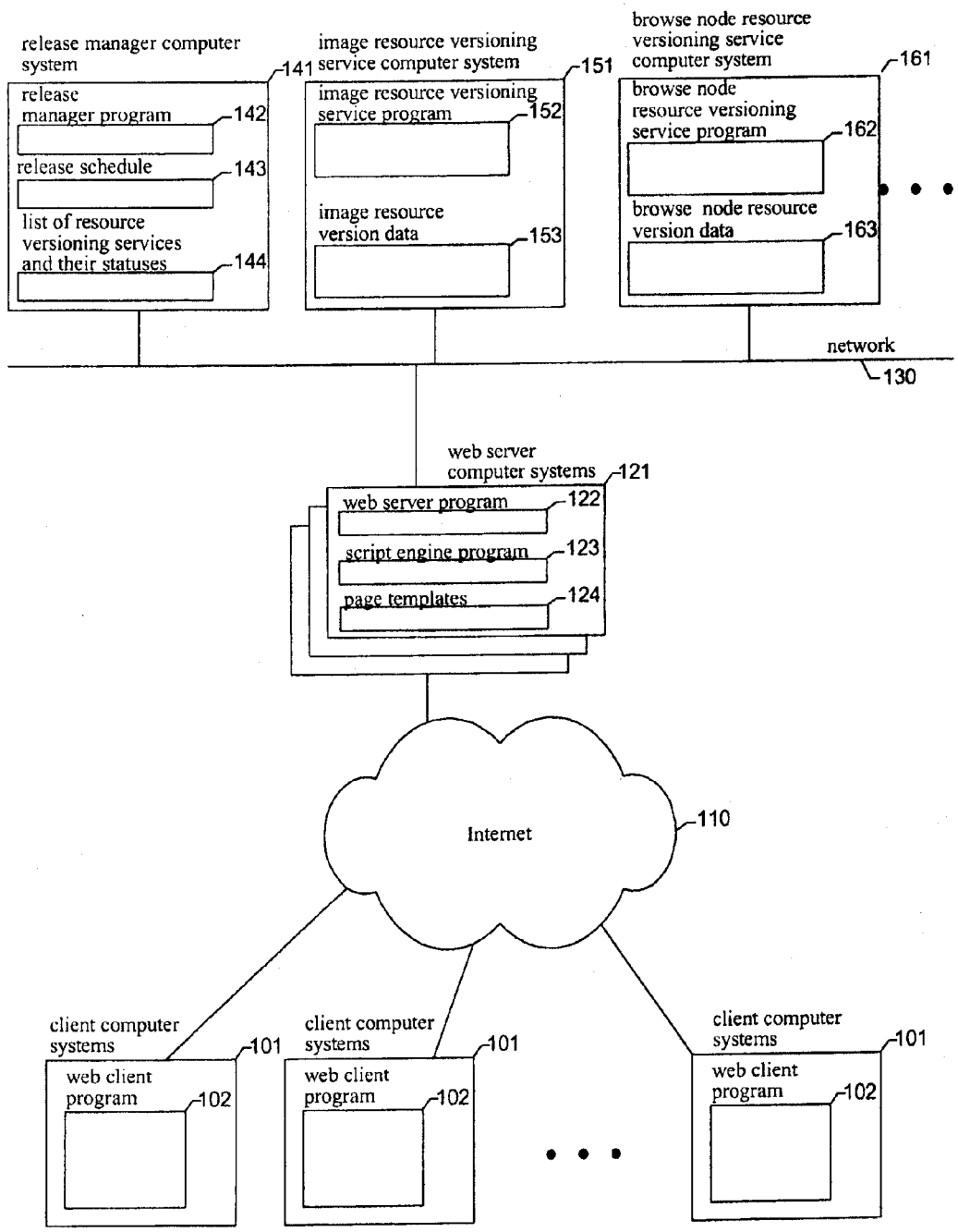
FIG. 1 is a block diagram showing a typical environment in which the facility operates.

A software facility for managing the release of electronic content such as contents of a web site ("the facility") is provided. The facility may be used, for example, to mange the release of contents of an electronic commerce web site. In some embodiments, the release of content constitutes modifying resources incorporated in pages of a web site—such as images or browse nodes that define the order in which different groups of items may be browsed—by replacing earlier instances (or "versions") of the resources with new versions of the resources. For example, a new image may be substituted for an existing image, or a browse node could be changed to be the child of a different parent browse node. Each such change is assigned to a group of changes to be released simultaneously at a specified time. Such a group is called a "release."

In some embodiments, a resource is incorporated in a particular page of a web site by including an instruction to retrieve the resource in a script. The script executes to transform a template representing the page into the actual page. The instruction contains an identifier, called a "resource identifier," that refers to the resource and all of its versions. When the script is executed in response to a request to serve the page, the resource retrieval instruction is passed to a resource versioning service together with the resource identifier. The resource versioning service determines the version of the web site for which the page is being rendered, called "the release-to-render." The release-to-render is typically either a live release that is currently being presented to customers (or other consumers of the web site) or a future release that is scheduled to be presented to customers at a future time. The resource versioning service typically makes this determination based on the identity and current preferences of the user requesting the page, discerned either by receiving this information along with the resource identifier from the template's script, or by accessing context information associated with the user and/or the user's web browsing session. The resource versioning service uses the determined release-to-render, together with the version of the release incorporated in the live release and changes earlier specified for the determined release-to-render and earlier-scheduled releases, to identify, then retrieve or construct the appropriate version of the resource identified by the resource identifier. The resource versioning service returns this version of the requested resource to the template's script for inclusion in the web page that is generated from the template. In these embodiments, it is possible to serve different versions of pages of the web site without ever modifying the contents of the template that represents the page, and without including in the template's script any logic—such as tests and multiple code paths—for determining the proper version of the page to render.

In some embodiments, one or more user interface tools are available for specifying that resources be modified in particular ways in particular releases. For example, an image tool may be used to replace one image with another in a designated future release by, in that release, replacing the current version of an image resource with a new version of the image resource. Each time a tool is used to specify a change for a release, the tool calls the resource versioning service, which stores the specified change in connection with the designated release. Such tools are described in greater detail in U.S. patent application Ser. No. 10/335,222, whose contents are hereby incorporated by reference in their entirety.

In some embodiments, the resource versioning service responds to a set of commands, such as an application programming interface ("API"), for releasing a future release by substituting it for the current live release, making it the new live release. In some embodiments, these commands include commands for optimizing for the retrieval of the versions of resources associated with the new live release; changing the future release to be the new live release; reversing this change if attempts to make the change fail; and discarding resource versions needed for the previous live release. These commands are typically issued by a release manager component, in response either to user instructions or a predetermined schedule.

In some embodiments, the facility provides different resource versioning services, and/or different user interface tools, for different types of resources. For example, an image tool may call an image resource versioning service to store changes to images specified for a release by a user, which is called by scripts that need to retrieve versions of image resources, while a separate browse tool may call a browse resource versioning service to store changes to browse nodes specified for a release by a user, which is called by scripts that need to retrieve versions of browse node resources. Such specialization permits both tools and resource versioning services to be more fully tailored to specific types of resources. For tools, this means that they can be more intuitively and efficiently used to specify changes to particular kinds of content, while, for resource versioning services, this means that resource versions and changes thereto can be stored and manipulated more efficiently. The ability to use multiple resource versioning services helps to make extensible the set of different resources managed by the facility. Where multiple resource versioning services are used, each typically implements the API described above.

In some embodiments, the facility is used to manage changes to a web site containing content for a number of different publishers, such as a number of different merchants. In some such embodiments, in order to grant the permissions needed by each publisher to specify changes to their own content without being able to specify changes to—or otherwise access—content of other publishers, the facility provides publisher access controls that enforce a publisher access model. The publisher access model typically classifies content data for the web site as being visible and modifiable to either zero or one publishers. For example, a first piece of content data published by publisher A may be visible and modifiable to publisher A and its users, a second piece of content data published by publisher B may be visible and modifiable to publisher B and its users, and a third piece of content data relating to the web site as a whole but not to any individual publisher may be visible and modifiable to no publishers. In some cases, part or all of the access model is defined in terms of a content data tree, representing some or all of the content data stored for the web site. A subtree of the content data tree is specified for access by a particular publisher by associating that publisher's identity with the node of the content data tree that is the root of the subtree. Such subtrees are typically selected in such a way so that they do not intersect, such as by having some or all of the subtrees have their root at nodes at the same depth in the content data tree. In some embodiments, the publisher access model enforced by the facility's publisher access controls also controls the set of actions users associated with a particular publisher may take, such as which kinds of modifications the publisher and its users can make to the content, e.g., by restricting which of the facility's API functions a publisher and its users may invoke.

FIG. 1 is a block diagram showing a typical environment in which the facility operates. A number of client computer systems 101 are connected via the Internet 110 or another network to a load-balancing group of web server computer systems 121. Each client computer system has a web client program 102 for browsing web pages served by the web server computer systems. A client computer system may be virtually any device capable of displaying electronic content, including desktop computers, laptop computers, tablet computers, PDAs, wireless phones, ATMs, wearable computer systems, vehicle-mounted computer systems, televisions, and others. A client computer system may be used either by a web site designer to specify changes to resources for a future release, or by a customer or other consumer of the web site to browse the live release of the web site.

The web server computer systems typically each contain a web server program 122 for receiving and responding to web browsing requests; page templates 124 each corresponding to a different web page and being used by the web server program to generate that web page in response to web browsing requests for that web page; and a script engine program 123 that executes scripts occurring on page templates that are being used to generate pages for response to web browsing requests. For example, a script in a page template may instruct the script engine to retrieve a particular resource or other piece of content. Where a script instructs the script engine to retrieve a resource that may have different versions for different releases, the script engine program typically calls a resource versioning service program to retrieve a version of the resource that is appropriate for the intended release.

In some embodiments, there is a specialized resource versioning service program for each different type of resource. For instance, image resource versioning service program 152 responds to requests for versions of image resources, while browse node resource versioning service program 162 responds to requests for versions of browse node resources. In some embodiments, each resource versioning service program executes on a different computer system connected to the web server computer systems 121 by a network 130. For example, the image resource versioning service program 152 executes on an image resource versioning service computer system 151. Each resource versioning service computer system typically also contains specialized resource version data for the corresponding resource type. For example, the image resource versioning service computer system 151 contains image resource versioning data 153, used by the image resource versioning service program 152 to identify and generate the appropriate version of the requested resource. Also connected to network 130 is a release manager computer system 141, upon which executes a release manager program 142. The release manager program 142 typically manages the process of creating and scheduling new releases, and correspondingly maintains a release schedule 143. The release manager computer system typically also contains a list of resource versioning services, such as image resource versioning service program 152 and browse node resource versioning service program 162, as well as the last known status of each such service. The release manager program is responsible for releasing a future release by substituting it for the current live release, which typically involves calling the release manager API implemented by each of the release versioning service programs. In some embodiments, the release manager program also may be used to poll the release versioning service programs for all the changes under their control that are scheduled for a particular release, in order to generate a report of all the changes of all types included in a particular future release.

While various functionalities and data are shown in FIG. 1 as residing on particular computer systems that are arranged in a particular way, those skilled in the art will appreciate that such functionalities and data may be distributed in various other ways across one or more computer systems in different arrangements.

Figure 2:
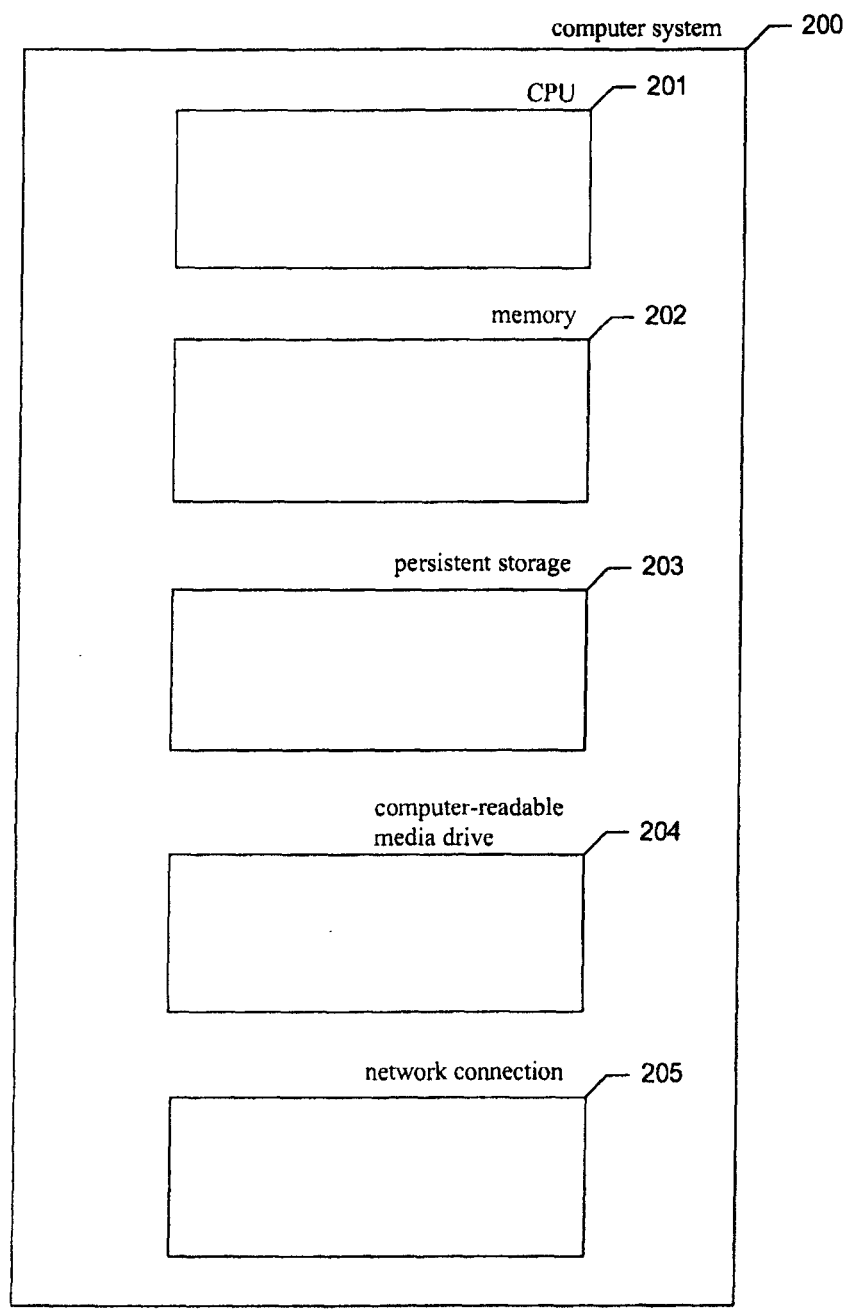
FIG. 2 is a block diagram showing some of the components typically incorporated in at least some of the computer systems and other devices on which the facility executes.

FIG. 2 is a block diagram showing some of the components typically incorporated in at least some of the computer systems and other devices on which the facility executes. These computer systems and devices 200 may include one or more central processing units ("CPUs") 201 for executing computer programs; a computer memory 202 for storing programs and data—including data structures—while they are being used; a persistent storage device 203, such as a hard drive, for persistently storing programs and data; a computer-readable media drive 204, such as a CD-ROM drive, for reading programs and data stored on a computer-readable medium; and a network connection 205 for connecting the computer system to other computer systems, such as via the Internet, to exchange programs and/or data—including data structures. While computer systems configured as described above are typically used to support the operation of the facility, one of ordinary skill in the art will appreciate that the facility may be implemented using devices of various types and configurations, and having various components.

Figure 3:
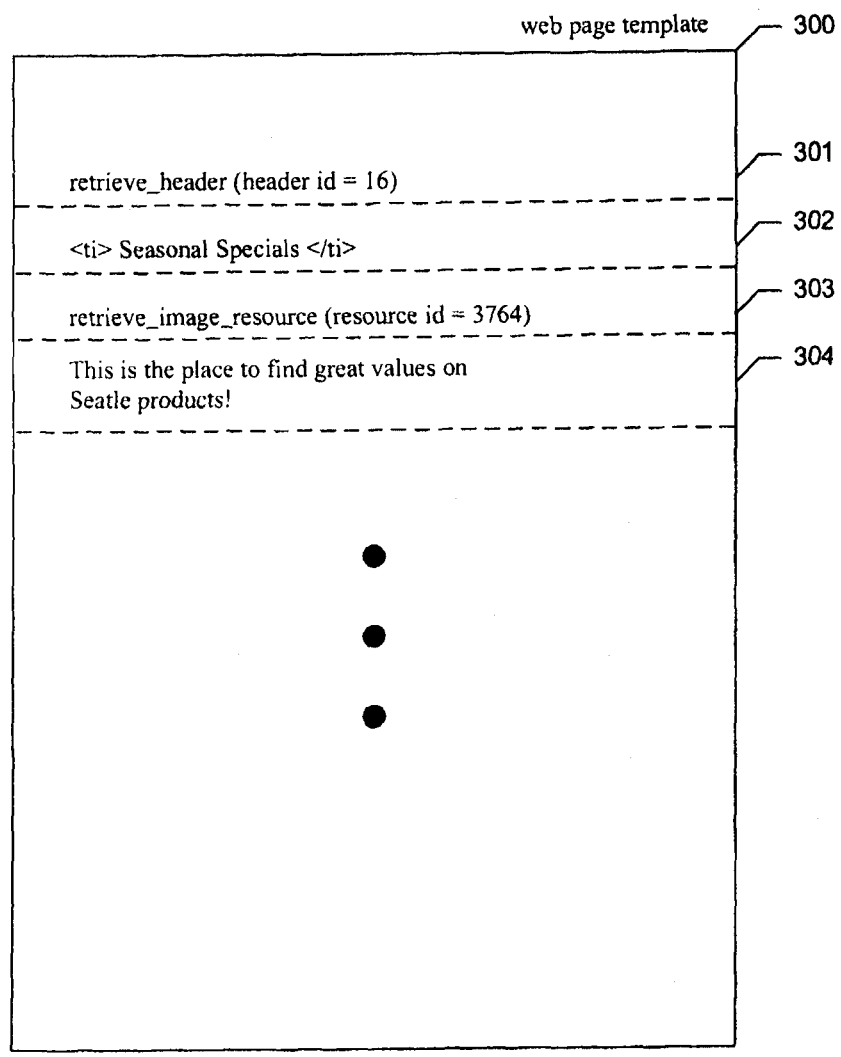
FIG. 3 is a diagram showing a sample template used in conjunction with the facility in order to represent a particular page of a web site.

FIG. 3 is a diagram showing a sample template used in conjunction with the facility in order to represent a particular page of a web site. The template 300 includes native content, such as sections 302 and 304, that becomes part of the web page rendered from the template. The template further includes script instructions, such as those appearing in sections 301 and 303, which are executed by the script engine in order to incorporate additional content in the rendered page. In particular, section 303 contains a retrieve_image_resource script instruction. In executing this instruction, the script engine calls the image resource versioning service program, passing it the resource identifier of the resource to retrieve, in this case 3764. It can be seen that web page template 300 does not contain any versioning logic—that is, two or more different paths of execution in the script each corresponding to a different version of the page, where a particular path of execution is selected by a case statement or other logic element based upon the desired version of the page. Rather, it can be seen that the template contains only a single path of execution, and the same call to the image resource versioning service program is executed irrespective of which version of the page is to be rendered.

Figure 4:
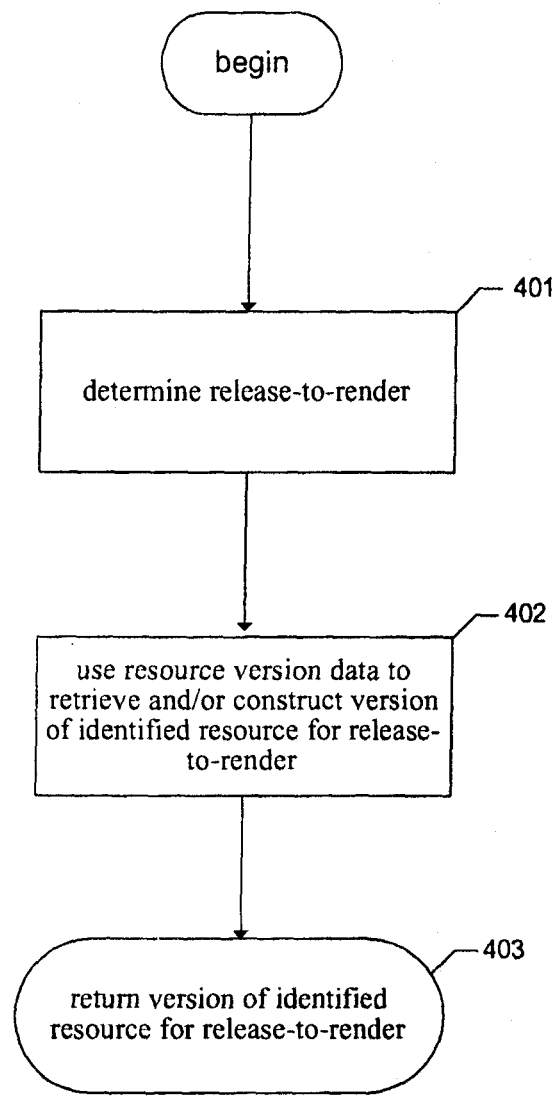
FIG. 4 is a flow diagram showing steps typically performed by the facility in a resource versioning service program that is called by a script engine to retrieve a resource.

FIG. 4 is a flow diagram showing steps typically performed by the facility in a resource versioning service program that is called by the script engine to retrieve a resource. In step 401, the facility determines the release for which the page incorporating the resource is being rendered, called the "release-to-render." Generally, the release-to-render is based upon the identity of the user requesting the page, and, in some cases, preferences set by that user. If the user requesting the page is a customer or other consumer of the web site, the user will typically request the page anonymously. In this case, the release-to-render typically defaults to the current live release. Alternatively, developers wishing to preview future releases of the web site generally log in, authenticating their identity. Once logged in, such users generally set a preference indicating which future release of the web site the designer would like to display. For designers, this future release becomes the release-to-render. The release-to-render may be conveyed to the release versioning service program in a variety of ways. In some embodiments, the release-to-render is stored as part of a set of context data maintained either for the user or the user's current session, and is retrieved from the context data set by the resource versioning service program. In some other embodiments, the release-to-render is passed to the release versioning service program by the script on the page template as an additional parameter to the retrieve_resource instruction. In step 402, the facility uses the resource version data to retrieve and/or construct a version of the resource identified by the resource identifier for the release-to-render determined in step 401. The performance of step 402 is described in further detail below in conjunction with FIGS. 5 and 6. In step 403, the facility returns to the calling script the version of the identified resource for the determined release-to-render produced in step 402. After step 403, these steps conclude.

Figure 5:
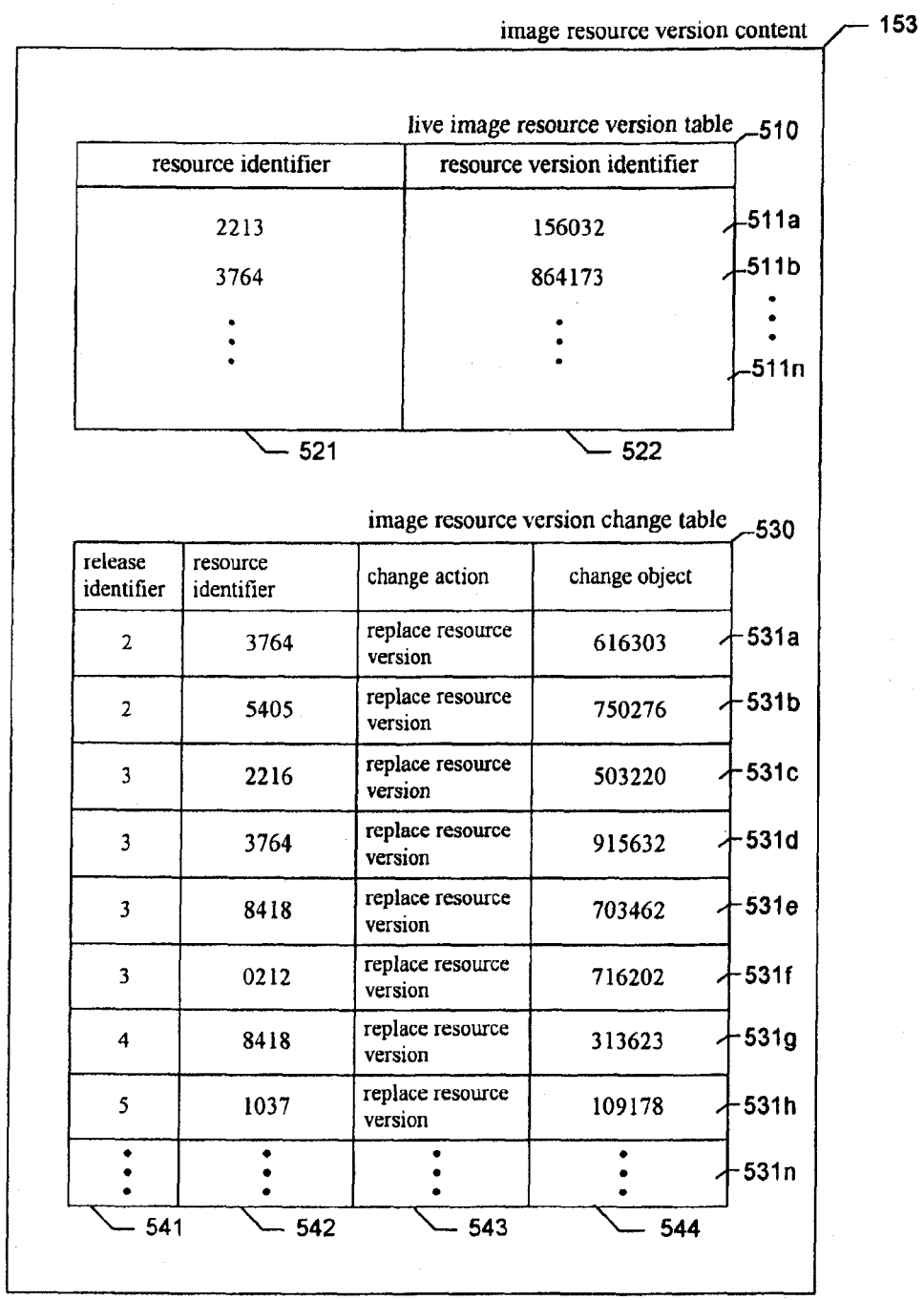
FIG. 5 is a data structure diagram showing sample resource version data maintained by the image resource versioning service.

FIG. 5 is a data structure diagram showing sample resource version data maintained by the image resource versioning service. The image resource version data 153 includes a live image resource version table 510, and an image resource version change table 530. The live image resource version table maps from the resource identifier of each image resource occurring in the current live release to a resource version identifier that may be used to retrieve the version of that resource specified for the current live release. Where the release-to-render is the current live release, this permits the release versioning service to very efficiently look up the resource version identifier specified for a resource identifier in the live release and retrieve the content for that resource version, as is described in greater detail below in conjunction with FIG. 6. The live image resource session table includes rows 511a . . . 511n, each divided into two columns: a resource identifier column 521, and a resource version identifier column 522. The live image resource version table indicates, for instance, that the resource version identifier specified for the requested resource, which has resource identifier 3764, is 864173.

The image resource version change table 530 is used by the resource versioning service to respond to resource version requests for future releases. The image resource version change table is made up of rows 531a . . . 531n, each corresponding to a change to an image resource that has been specified for a particular future release. Each row is divided into the following columns: a release identifier column 541 identifying the release for which the change is specified; a resource identifier column 542 that identifies the resource for which the change is specified; a change action column 543 that indicates a type of change to be made to the resource; and a change object column 544 that contains information used to complete the change, in this case the resource version identifier with which the existing resource version identifier for the resource is to be replaced.

When the image resource versioning service receives a resource retrieval request where the release-to-render is a future release, the image resource versioning service begins at the last row of the image resource version change table for the release-to-render, and searches upward for the first occurrence of the resource identifier of the requested resource. If the change action of that row renders moot any changes to the resource in earlier releases, then the resource versioning service uses the information in the change object column of the row to identify the resource version to be retrieved and returned. For example, completely replacing an earlier version of a resource with a new version obviates any other changes to that resource in earlier releases. Otherwise, the resource versioning service program continues to search upward in the image resource version change table for additional rows containing the resource identifier in question.

For example, where the resource versioning service receives a request for the resource having resource identifier 3764 for release-to-render 4, the facility begins in row 531g, the last row containing release identifier 4, and searches upward in the image resource version change table for the first occurrence of resource identifier 3764, which occurs on row 531d. The release versioning service determines that the change action specified in row 531d ("replace resource version") obviates any earlier changes specified for this resource, and uses the image resource version identifier, 915362, appearing in the change object column of this row, to retrieve the content constituting this image resource version. Had the requested resource identifier not been found in the upward search of the image resource version change table, the resource versioning service would revert to the live image resource session table, using the resource version identifier 864173 specified for the current live version and appearing in the resource version identifier column of row 511*b*, to retrieve the resource version content for the resource version being used in the current live release. Had the change action in row 531*d* not obviated further searching in the image resource version change table, the resource versioning service would have continued to search upward in that table, selecting rows containing the same requesting resource identifier until either a change action was found that obviated further searching, or the top of the table was reached. If a change action obviating further searching is found, all the selected rows of the image resource version change table are applied together to generate the requested resource version. Otherwise, all of the selected rows of the image resource version change table are applied to the resource version identified in the live image resource version table to construct the requested resource version.

While FIG. 5 and other figures that follow show tables whose contents and organization are designed to make them more readily understood by a human reader, those skilled in the art will appreciate that actual data structures used by the facility to store this information may differ from the tables shown, and that they, for example: may be organized in a different manner; may contain more or less information than shown; may be compressed and/or encrypted; may be indexed or otherwise instrumented; etc.

Figure 6:
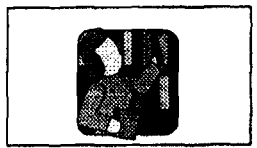
FIG. 6 is a data structure diagram showing a sample image resource version content table containing the digital content constituting each image resource version.
Figure 6:
Figure 6:
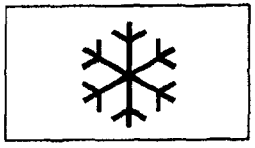

FIG. 6 is a data structure diagram showing a sample image resource version content table containing the digital content constituting each image resource version. The image resource version content table 600 is comprised of a number of rows including rows 601, 602, and 603, each corresponding to the digital content comprising a single image resource version. Each row is divided into two columns: a resource version identifier column 611 containing a resource version identifier identifying the image resource version to which the row corresponds, and a research version content column 612, containing the digital content that makes up the resource version to which the row corresponds. For example, where the image resource having resource identifier 3764 is retrieved for the current live release, the facility uses resource version identifier 864173 from row 511*b* of the live image resource version table to retrieve the content from row 602 of the image resource version content table. When the same resource is retrieved for the future release having a release identifier 4, the facility uses the resource version identifier in row 531*d* of the image resource version change table, 915632, to retrieve the content in row 603 of the image resource version content table. The image resource version content table may be stored as part of the image resource version data stored on the resource version in service computer systems, or it may be stored in another computer system or storage device accessible via the network. Rather than returning resource version content itself to the script engine program executing on the web server computer system, the resource versioning service may instead return a reference to the resource version content, such as its resource version identifier, enabling the web server computer system to itself retrieve the content constituting the resource version.

As discussed above, each resource versioning service typically implements an API that permits it to be controlled by the release manager. The functions constituting this API are discussed in more detail here.

The release manager invokes a GetReleaseChanges function to retrieve from the resource versioning service an enumeration of all changes in the possession of the resource versioning service that are associated with a particular future release. The function takes as a parameter the release identifier for this release, and returns the requested set of changes. In some embodiments, this function can take as its parameter a range of release identifiers, in which case the function returns the changes in the possession of the resource versioning service that are associated with any release identifier within the range.

The release manager invokes a BuildRelease function against each of the resource versioning services as the first step in transitioning from the current live release to a new live release. The function takes one or more parameters specifying a group of one or more future releases to "build"—that is, construct a more-efficient-to-access representation of all of the resource versions used in the new live release. As one example, when this function is invoked for the image resource versioning service, it might construct a new copy of the live image resource version table by applying the changes specified for the selected releases in the image resource version change table. This function returns when the build process is completed.

The release manager invokes a FlipRelease function for each resource versioning service as the next step of transitioning to a new live release, after all of the resource versioning services have completed their BuildRelease invocations. When this function is invoked, the resource versioning service changes its state to use the new version of the efficient-to-access representation of the resource versions used by the new live release to be used when responding to requests for resources where the release-to-render is the live release. For example, when this function is invoked for the image resource versioning service, it would replace the original live image resource version table with the new image resource version table constructed during the BuildRelease invocation. The FlipRelease function is typically a fast operation that is largely synchronized across the site, whereas the preceding Build Release function is a more time-intensive operation.

The release manager invokes an UnflipRelease function for one or more resource versioning services where a problem has occurred, such as a new release has not worked properly after being flipped by invoking the FlipRelease function. The function restores the state of the resource versioning service to resume using the older efficient-to-access representation of resource versions used in the current live release. The Unflip-Release thereby returns the resource versioning service to its previously operational state in order to allow the new build to be corrected.

The release manager invokes a CleanupRelease function for each of the resource versioning services as the next step of transitioning to a new live release, once all of the resource versioning services have completed their FlipRelease invocations. When this function is invoked, the resource versioning service archives or destroys the replaced efficient-to-access representation of the resource versions used in the current live release, which is no longer needed.

The release manager invokes a GetReleaseStatus function for a particular resource versioning service in order to determine its current status. These statuses can include: a Build-Complete status, where a BuildRelease invocation has successfully completed; a ReleaseFlipped status, where a FlipRelease invocation has successfully completed; a ReleaseUnflipped status, where an UnflippedRelease invocation has successfully completed; and a CleanupComplete status, where a CleanupRelease invocation has successfully completed.

Figure 7:
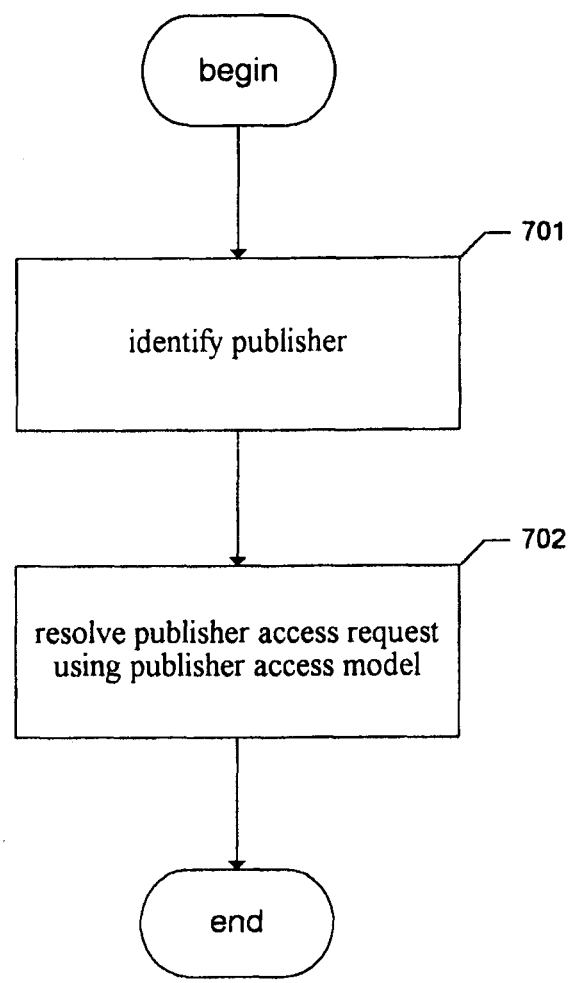
FIG. 7 is a flow diagram showing steps typically performed by the facility in order to regulate access to the data constituting a web site that includes content from several different publishers, such as merchants.

FIG. 7 is a flow diagram showing steps typically performed by the facility in order to regulate access to the data constituting a web site that includes content from several different publishers, such as merchants. These steps are typically performed by the facility when a user, authenticated to be authorized on behalf of one of the publishers, attempts to modify content on the web site. In step 701, the facility identifies the user (and thereby the publisher) that is attempting to modify the web site. At step 702, the facility resolves a publisher access request using a publisher access model specifying the access rights of different publishers. After step 702, the steps conclude.

Figure 8:
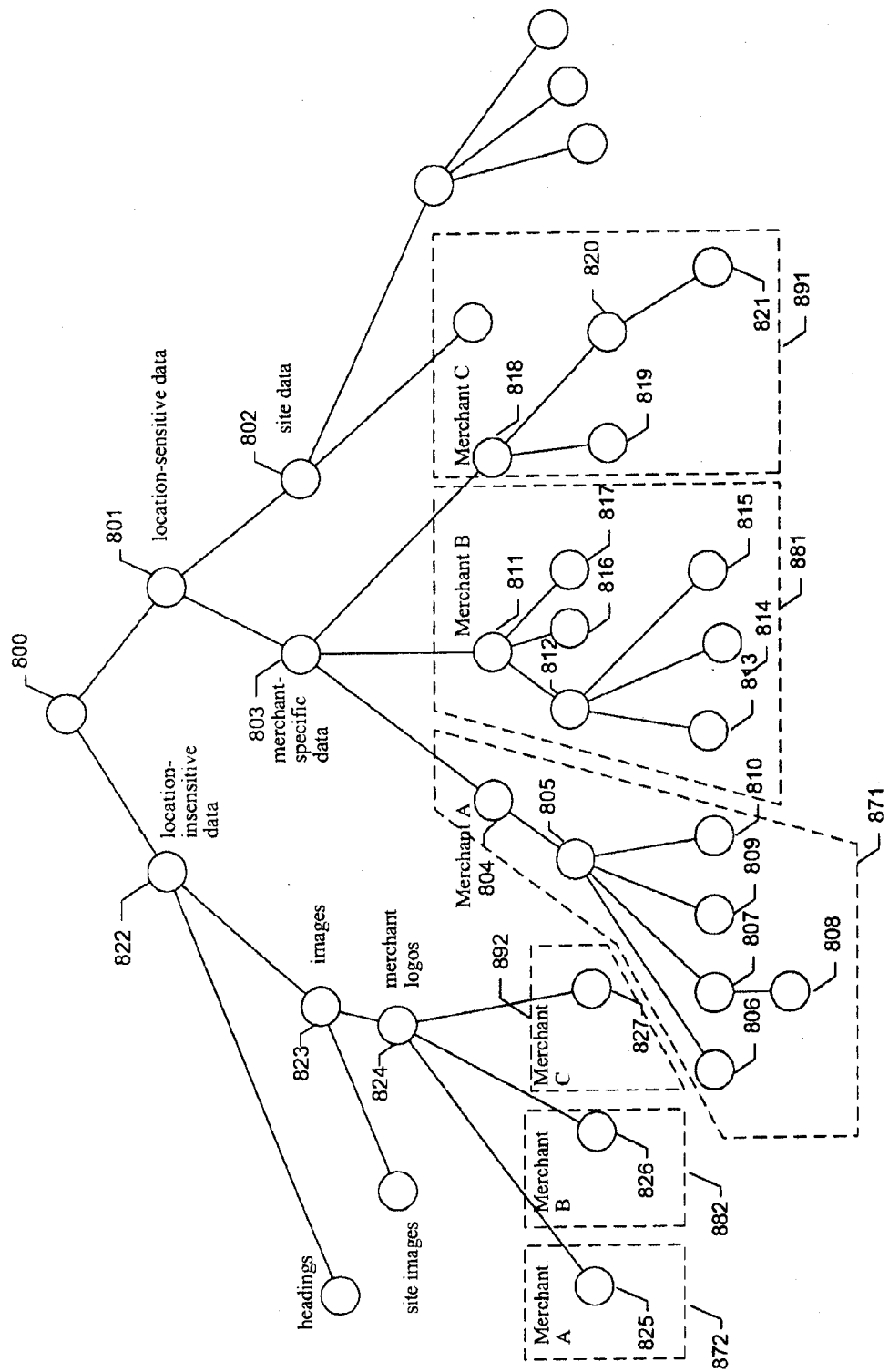
FIG. 8 is a data structure diagram showing a sample access model used by the facility to regulate access to the data constituting a web site by users representing different publishers.

FIG. 8 is a data structure diagram showing a sample access model used by the facility to regulate access to the data constituting a web site by users representing different publishers. The tree has a root node 800, of which all of the other nodes in the tree are descendents. Two nodes, nodes 801 and 822, are direct descendents, or "children" of root node 800. A subtree defined by node 801—that is, node 801 and all of its descendents—contains data relating to location-sensitive data within the web site. The subtree defined by node 803, one of node 801's children, contains data that is specific to individual merchants. Node 803's children, nodes 804, 811, and 818, in turn, each define a subtree exclusively containing merchant-specific location-sensitive data. For example, the nodes in node group 871 that constitute the subtree defined by node 804 all relate to data that is specific to merchant A. Accordingly, node 804 is marked for exclusive modification access by users authorized by merchant A. Other data that is specific to merchant A elsewhere in the tree, such as node 825, is similarly marked for exclusive modification access users authorized by merchant A. Other nodes are similarly marked in order to designate the subtrees they define for exclusive access by other merchants. Nodes not appearing in any of these marked subtrees are typically not available for modification by any merchant, and typically may be modified only by users authorized by the organization maintaining the web site as a whole. While FIG. 8 depicts one approach to control the access of multiple merchants to a website, it will be appreciated that a number of other alternate access-control schemes will be known to those skilled in the art.

It will be appreciated by those skilled in the art that the above-described facility may be straightforwardly adapted or extended in various ways. For example, the release manager API described above may be modified in various ways, such as by adding additional functions, deleting existing functions, modifying parameters, return values, or behaviors, etc. The resource retrieval mechanism may be implemented in a variety of different forms. Different data structures may be used to store merchant access information. The facility may be straightforwardly adapted to virtually any context in which resources are related via data dependencies that require synchronization. The facility may be operated in a variety of different kinds of environments, and its functionalities and data distributed in different ways within those environments. While the foregoing description makes reference to preferred embodiments, the scope of the invention is defined solely by the claims that follow and the elements recited therein.

We claim:

1. A method in a content storage component for storing digital resources that may be embodied in different versions at different times, comprising:
   storing a data structure to manage future content changes to a content site for a plurality of different publishers, wherein the data structure comprises a plurality of entries each corresponding to a change to be made to an identified resource for the content site, wherein a given entry of the plurality of entries comprises:
      a release identifier corresponding to a preview version of a future release for the content site,
      a resource identifier that identifies a respective resource of the content site to be changed,
      a manner in which to alter a version of the respective resource for a release identifier preceding the release identifier of the given entry to produce a new version of the respective resource; and
   receiving an access request from a given publisher of the plurality of publishers to modify or view a specified resource in the data structure, wherein the access request includes a specified resource identifier and a specified release identifier corresponding to the specified resource;
   in response to the access request from a given publisher of the plurality of publishers to modify or view the specified resource in the data structure:
      resolving the access request from the given publisher using a publisher access model, wherein the publisher access model classifies resources of the content site as visible and modifiable by only specific publishers of the plurality of publishers;
      determining, from among a plurality of release identifiers in the data structure ordered according to release versions, an entry in the data structure containing a release identifier and resource identifier corresponding to specified resource with the specified release identifier and the specified resource identifier; and
      determining, from among release versions prior to a release version corresponding to the specified release identifier, one or more additional entries in the data structure containing prior versions of specified resource; and
      applying changes together to the specified resource from the determined entry and the one or more additional entries to generate a resource version in response to the access request to the given publisher.

2. The method of claim 1 wherein the release identifier for the given entry specifies a time at which the respective resource is to be altered by identifying a release event with which the specified future release of the respective resource is associated.

3. A method, comprising:
   receiving a resource version retrieval request from a given publisher, the resource version retrieval request includes a specified resource identifier and a specified resource version identifier for identifying a resource with a specified version to be retrieved,
      wherein the specified version of the identified resource is part of a body of content visible and modifiable only by specified publishers from among a plurality of publishers in accordance with a publisher access model;
   in response to resolution of the resource version retrieval request using the publisher access model indicating that the given publisher is allowed to retrieve the identified resource:
      accessing an indicated effective time applying to the received resource version retrieval request,
         wherein the indicated effective time comprises a specified time corresponding to a future release of the specified version of the identified resource, and the indicated effective time is retrieved from a context variable of the given publisher; and returning, in response to the resource version retrieval request, the specified version of the identified resource that embodies the identified resource at the indicated effective time.

4. The method of claim 3 wherein the accessed indication of effective time is an indication of a release applying to the received resource version retrieval request, the indicated effective time being associated with the indicated release.

5. The method of claim 4 wherein the identified resource has a current version, and wherein a plurality of releases are each scheduled for a different future time, and wherein each release may specify a change to the identified resource, the method further comprising determining the result of applying to the current version of the identified resource the changes specified by the releases up to and including the indicated release, and wherein the version of the identified resource returned is the determined result.

6. The method of claim 3 wherein the accessed indication of an effective time is contained in the received resource version retrieval request.

7. The method of claim 3 wherein the future release of the version is with respect to a version of the identified resource that is part of a currently-published body of content, and wherein the accessed indication of an effective time applying to the received resource version retrieval request indicates a time later than the current time.

8. The method of claim 3 wherein the accessed indication of an effective time applying to the received resource version retrieval request indicates a future time.

9. A non-transitory computer-readable medium whose contents cause a computing system to perform:
receiving a resource modification request from a given publisher, the resource modification request comprising:
a resource identifier that identifies a resource,
a release identifier that identifies a future release corresponding to the resource, and
a modification that is to be made to a version of the identified resource included in a prior release, the modification to be made to preview the identified future release of the identified resource,
resolving the resource modification request from the given publisher using a publisher access model wherein the publisher access model classifies resources of the content site as visible and modifiable by only specific publishers of a plurality of publishers;
performing the request resource modification based on said resolving indicating that the given publisher has permission to modify the identified resource,
in response to receiving, from the given publisher, a resource retrieval request specifying a future release identifier:
resolving the resource retrieval request using the publisher access model,
accessing a list of resource modifications specified for releases earlier than for the specified future release identifier; and
generating particular content based on the accessed list of resource modifications specified for the earlier releases.

10. The non-transitory computer-readable medium of claim 9, wherein the resource retrieval request identifies a range of releases, and wherein the list of resource modifications comprises previously received resource modification requests for the identified range of releases.

11. A computing system, comprising:
one or more processors; and
a memory coupled to at least one of the one or more processors, wherein the memory stores instructions that when executed by one of the one or more processors performs:
implementing an input component for receiving a resource retrieval instruction from a given publisher, the resource retrieval instruction including a resource identifier to identify a resource to be retrieved, and a release identifier to identify a future release of the resource or specific changes to the resource, wherein the resource retrieval instruction is originated in order to retrieve a version of the identified resource that is part of a body of content visible and modifiable only by specified publishers from among a plurality of publishers in accordance with a publisher access model;
implementing an analysis component for determining, based on the resource identifier and the release identifier, a release for which to retrieve the resource identified by the received resource retrieval instruction;
implementing an identification component for identifying, based on the resource identifier and a resource version identifier, a version of the resource identified by the received resource retrieval instruction for the release determined by the analysis component; and
implementing an output component for, in response to the received resource retrieval instruction, providing the version for the release of the resource that is identified by the analysis component and the identification component.

12. The computing system of claim 11 wherein the resource identified by the received resource retrieval instruction has a current version, wherein each of multiple releases is scheduled for a different subsequent time, wherein each of the multiple releases may specify a modification to the current version of the resource identified by the received resource retrieval instruction, and wherein the identification component identifies the version of the resource by determining the outcome of applying to the current version of the resource modifications specified by the release determined by the analysis component and releases prior to the release determined by the analysis component.

13. The computing system of claim 11 wherein the analysis component determines the release by accessing an indication of the release contained in the received resource retrieval instruction.

14. The computing system of claim 11 wherein the resource retrieval request is initiated on behalf of an initiating user, and wherein the analysis component determines the release by accessing a context variable of the initiating user.

15. The computing system of claim 11 wherein the resource retrieval request is initiated to retrieve a currently published version of the resource, and wherein the version of the resource is identified by the resource retrieval instruction, and wherein the release determined by the analysis component is the current release.

16. The computing system of claim 15 wherein the release determined by the analysis component is a future release.

* * * * *